US006130692A

United States Patent [19]

Mochizuki et al.

[11] Patent Number: 6,130,692

[45] Date of Patent: Oct. 10, 2000

[54] PRINTHEAD OPERATING BY TIME DIVISIONAL DRIVING OF BLOCKS OF PRINTING ELEMENTS, AND HEAD CARTRIDGE AND PRINTER USING SUCH A PRINTHEAD

[75] Inventors: Muga Mochizuki; Ichiro Saito, both of Yokohama; Yoshiyuki Imanaka, Kawasaki; Teruo Ozaki, Yokohama; Toshimori Miyakoshi, Kawasaki, all of Japan

[73] Assignee: Canon Kabushiki Kaisha, Tokyo, Japan

[21] Appl. No.: 08/902,946

[22] Filed: Jul. 30, 1997

[30] Foreign Application Priority Data

Jul. 31, 1996 [JP] Japan .................................... 8-202039

[51] Int. Cl.[7] ................................ B41J 2/05; B41J 2/155; G01D 15/10

[52] U.S. Cl. ................................ 347/57; 347/42; 347/182

[58] Field of Search .............................. 347/57, 180, 182, 347/12, 181, 56, 59, 10, 11, 13, 41, 42

[56] References Cited

U.S. PATENT DOCUMENTS

| | | | |
|---|---|---|---|
| 4,313,124 | 1/1982 | Hara | 347/57 |
| 4,313,684 | 2/1982 | Tazaki et al. | 400/322 |
| 4,345,262 | 8/1982 | Shirato et al. | 347/57 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 5,367,324 | 11/1994 | Abe et al. | 347/43 |
| 5,479,197 | 12/1995 | Fujikawa et al. | 347/63 |
| 5,580,468 | 12/1996 | Fujikawa et al. | 216/27 |
| 5,790,140 | 8/1998 | Koizumi et al. | 347/12 |
| 5,896,146 | 4/1999 | Murata et al. | 347/57 |

FOREIGN PATENT DOCUMENTS

| | | |
|---|---|---|
| 0 394 910 | 10/1990 | European Pat. Off. . |
| 0 488 806 | 6/1992 | European Pat. Off. . |
| 0 592 221 | 4/1994 | European Pat. Off. . |
| 688671 | 5/1995 | European Pat. Off. . |
| 0 688 671 | 12/1995 | European Pat. Off. . |
| 2843064 | 4/1979 | Germany . |
| 54-51837 | 4/1979 | Japan . |
| 54-56847 | 5/1979 | Japan . |
| 59-123670 | 7/1984 | Japan . |
| 59-138461 | 8/1984 | Japan . |
| 60-71260 | 4/1985 | Japan . |
| 2-281973 | 11/1990 | Japan . |

*Primary Examiner*—John Barlow
*Assistant Examiner*—Juanita Stephen
*Attorney, Agent, or Firm*—Fitzpatrick, Cella, Harper & Scinto

[57] ABSTRACT

A printhead, constructed with a plurality of common-type element substrates which sandwich a connecting board, which performs printing by utilizing a common-type control signal. The element substrate integrates: a plurality of heaters 101 which are arrayed in one line, power transistors 102, a shift register 104, a latch circuit 117, an AND circuit 119, terminals 114 to 116 for inputting block-selection signals, a terminal 120 for inputting an inverse instruction signal which instructs to invert the block selection signal, a block inverter 121 for inverting the block-selection signal in accordance with the inverse instruction signal, and a 3 to 8 decoder 118 for selecting one of a plurality of blocks. By utilizing a printhead where at least two of the element substrate are arranged opposite to each other, and where plural arrays of printing elements are formed, printing is performed by dividing a plurality of printing elements into a plurality of blocks and time-divisionally driving each block. When this printing is performed, the inverse instruction signal inverts the order of block selection which has been inverted because of the element substrates arranged opposite to each other.

12 Claims, 7 Drawing Sheets

FIG. 6 - PRIOR ART
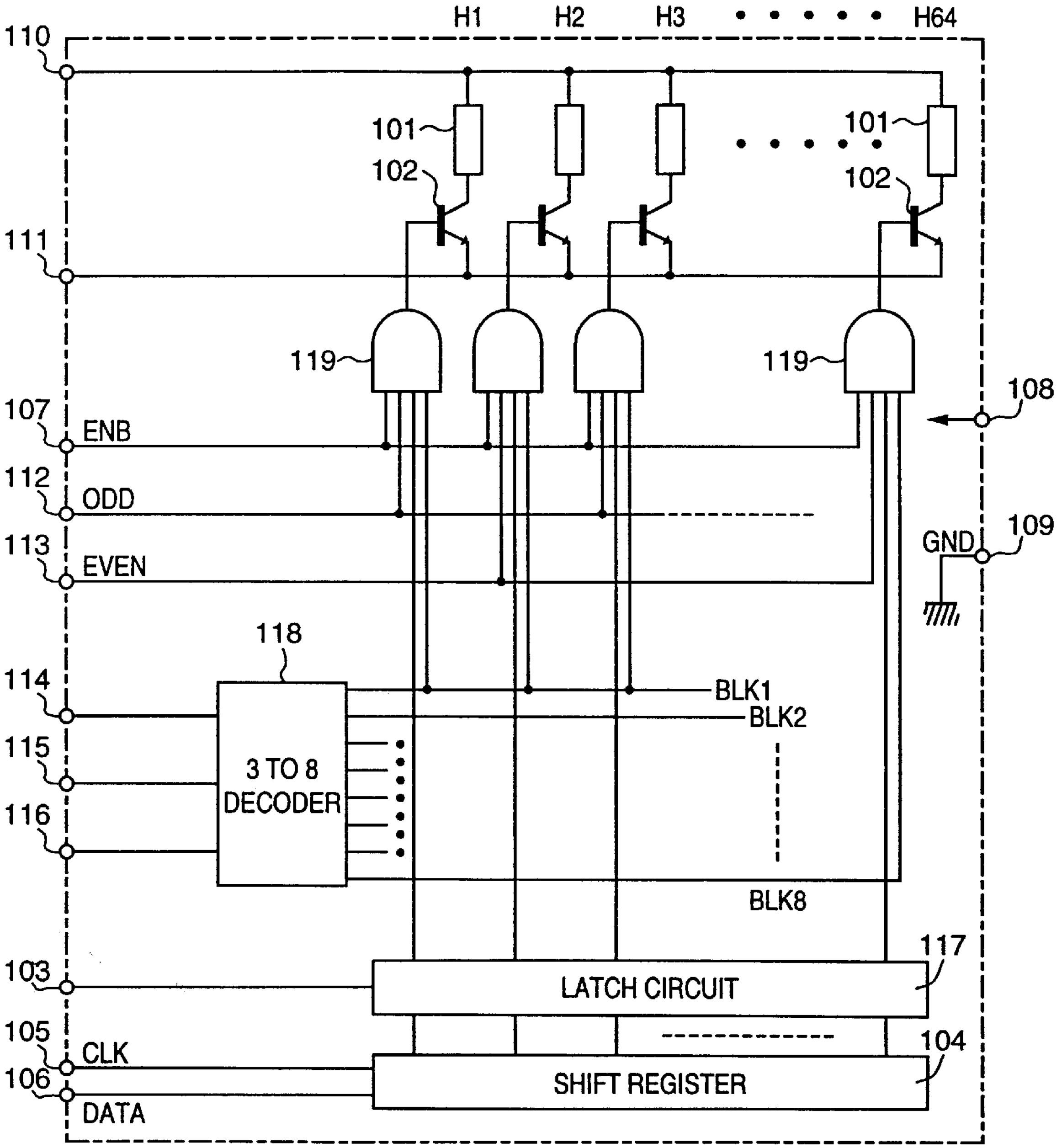

PRINTHEAD OPERATING BY TIME DIVISIONAL DRIVING OF BLOCKS OF PRINTING ELEMENTS, AND HEAD CARTRIDGE AND PRINTER USING SUCH A PRINTHEAD

BACKGROUND OF THE INVENTION

The present invention relates to a printhead, head cartridge and a printer using the printhead and, more particularly, to a printhead and head cartridge for performing printing in accordance with an ink-jet printing method, and a printer using the printhead.

Increasing interest has been brought to the ink-jet printing method where printing is performed by discharging ink from small orifices (discharge orifices) onto a print medium such as fabric, paper, sheet material and the like, because the method provides various advantages: for instance, noise generated at the time of printing is so small that it can be ignored; high-speed printing is possible; printing is realized by fixing ink on so-called regular sheets of paper without any special processing.

A number of techniques have already been proposed as a method of ink-jet printing. For instance, the ink-jet printing method disclosed in Japanese Patent Application Laid-Open No. 54-51837 and German Publication (DOLS: Deutschland Offenlegungsschrift) No. 2843064, has a different feature from those of other ink-jet printing methods in the way that heat energy is given to liquid (ink) to generate driving force for ink discharge.

According to the printing method disclosed in each of the above-mentioned patent publications, the liquid activated by heat energy changes its state due to rapid increase in volume. Driving force generated by the change in the state causes discharging of the liquid from an orifice (discharge orifice) provided at the end of a printhead, forming a discharging droplet, and the droplet adheres to a print medium to form a pixel, thereby executing printing. In particular, the printing method disclosed in DOLS No. 2843064 is not only effectively applied to so-called drop-on-demand printing, but also contributes to easy manufacturing of a full-line type printhead, that is, a printhead having a size as large as the width of the print medium and having multiple orifices arrayed in line, and in addition, contributes to have the discharge orifices at high density. Accordingly, the printing method is advantageous in a way that an image having high resolution and high quality can be obtained at high speed.

The printhead of an ink-jet printing apparatus adopting aforementioned printing method is configured with: an ink nozzle comprising a discharge orifice provided to discharge an ink droplet and a liquid channel connected to the discharge orifice, and an element substrate of the printhead integrating an electrothermal transducer (heater) for generating heat energy. The liquid channel constitutes a part of a heating unit where heat energy acts on the liquid.

Since the printhead normally has plural discharge orifices, plural heaters are arrayed in line on an element substrate in correspondence with the discharge orifices. Furthermore, another type of element substrate of the printhead has been developed where the element substrate includes, in addition to the plural heaters arrayed in line, a driver provided in one-to-one correspondence with the heater for driving each of the heaters in accordance with image data, a shift register for parallelly outputting image data, which has been serially inputted, to each driver, and a latch circuit for temporarily storing the data outputted by the shift register. Normally, the element substrate is designed such that the number of bits of image data stored in the shift register is equal to the number of the heaters. For instance, if the number of heaters is 64 (the number of discharge orifices are 64), 64-bit shift registers are utilized.

The element substrate integrating the above-described circuits is manufactured by monolithically forming an IC (Integrated Circuit) having a Bi-CMOS structure (a structure including a bi-polar transistor and a CMOS transistor) on, e.g., a silicon substrate, and further forming a heater as a heating unit.

FIG. 6 is an equivalent circuit diagram showing an internal configuration of a logical circuit integrated in the element substrate of the conventional printhead having 64 ink discharge orifices. As shown in FIG. 6, the element substrate includes 64 heaters 101 (heating elements: H1, H2, . . . , H64) arrayed in one line, and power transistors 102 serving as drivers are provided in one-to-one correspondence with each heater 101. One end of each heater 101 is connected to a terminal 110 provided to supply power for driving heaters, and the other end is connected respectively to a collector of a corresponding power transistor 102. An emitter of the power transistor 102 is commonly connected to a common terminal 111.

The period of time each power transistor 102 is turned on is controlled in accordance with a pulse signal inputted to a heat-pulse-width input terminal 107. Image data (DATA) from an external unit is serially inputted (e.g., b1, b2, . . . b64) to a shift register 104 in a unit of one bit. In the output side of the shift register 104, a latch circuit 117 is provided. The shift register 104, connected to a clock input terminal 105 and a data input terminal 106, executes shift operation in accordance with a clock (CLK) inputted to the clock input terminal 105. In addition, on the element substrate, a power supply terminal 108 for supplying power to the logical circuit portion e.g., the shift register 104, latch circuit 117 and the like, and a ground terminal (GND) 109 are provided. The aforementioned elements are the minimal structural elements necessary for the logical circuit of the printhead.

It is a known fact in the ink-jet printhead that, by decreasing the number of discharge orifices which simultaneously discharge ink, it is possible to appropriately refill ink from an ink tank to a liquid channel, possible to prevent image quality from deterioration and possible to realize high-quality printing. Therefore, the logical circuit is designed such that the printhead is divided into a number of blocks (8 blocks in FIG. 6) so that adjacent discharge orifices do not simultaneously discharge ink.

To achieve the divided control, the logical circuit comprises input terminals 114, 115 and 116 where 3-bit block-selection signals (B2, B1 and B0) are parallelly inputted, a 3 to 8 decoder 118 for decoding the block-selection signals inputted to the input terminals 114 to 116 into a signal for each block, input terminals 112 and 113 where an odd-numbered-element selecting signal (hereinafter referred to as an ODD signal) and an even-numbered-element selecting signal (hereinafter referred to as an EVEN signal) are respectively inputted, and AND circuits 119 each corresponding to the respective power transistor 102. The logical circuit is designed such that the 64 power transistors are divided into 8 blocks each having 8 transistors, and that adjacent power transistors, that is, an odd-numbered element (H1, H3, . . . , H63) and an even-numbered element (H2, H4, . . . , H64), are separately driven, so that the number of transistors simultaneously driven is four at the maximum.

Four types of signals are inputted to each AND circuit 119. Each AND circuit 119 drives corresponding power transistor 102 on the basis of a logical AND of a signal (BLK1, BLK2, . . . , BLK8) outputted by the 3 to 8 decoder 118 for a corresponding block, a pulse signal (ENB) inputted to the heat-pulse-width input terminal 107, odd-numbered element or even-numbered element selecting signals (ODD or EVEN), and a signal outputted by the latch circuit 117.

For instance, if a block-selection signal B2 (MSB) is inputted to the input terminal 114, a block-selection signal B1 is inputted to the input terminal 115, and a block-selection signal B0 (LSB) is inputted to the input terminal 116 (where B2=B1=B0=0), an output signal BLK1 outputted by the 3 to 8 decoder 118 becomes "ON" and the heaters H1, H2, . . . , H8 are selected. Further, when an ODD signal is inputted to the input terminal 112, odd-numbered heaters H1, H3, H5 and H7 are selected.

Note that the power transistor 102 is formed by bi-polar process, and the logical circuit portion (shift register 104, latch circuit 117, 3 to 8 decoder 118 and AND circuit 119 and so on) is formed by CMOS process.

In the foregoing conventional example, as shown in FIG. 7A, a single connecting board 302 is sandwiched by two element substrates 301. Thus, to construct a printhead as shown in FIG. 7B, plural element substrates are arranged opposite to each other. Thus, referring to FIG. 7B, heaters on the upper element substrate are arrayed in the order of H1, H2, . . . from the left, while heaters on the lower element substrate are arrayed in the order of H1, H2, . . . from the right. In other words, the order of heaters' array is opposite for the upper and lower element substrates. Accordingly, a problem arises in that, when printing is performed with the printhead having the above-described configuration, in order to match the order of data input with the order of heaters' array, the order of inputting a block-selection signal from an external unit (printer) must be changed for the upper element substrate and the lower element substrate, or wiring for the upper element substrate or lower element substrate must be changed.

In order to solve the above problem, various improvement have been made on the construction of the element substrate of the printhead.

For instance, Japanese Patent Application Laid-Open No. 2-281973 discloses a printhead, comprising a driving IC for a case where the printhead is constructed with the identical-type element substrates arranged opposite to each other, to enable signal input from right to left or left to right of the heaters' array, so that the direction of signal input can be appropriately selected.

However, according to the printhead disclosed in Japanese Patent Application Laid-Open No. 2-281973, the number of signal terminals which are provided to enable bi-directional signal input is doubled. Therefore, since an element substrate even larger than the conventional size is required in order to implement the signal terminals on the element substrate, it is difficult to down-size the element substrate. This problem also causes increase in manufacturing cost of the apparatus. Moreover, the printhead integrates the heaters for heating ink to discharge ink droplets and the IC for driving the heaters on separate element substrates. Thus, down-sizing of the printhead is not easily realized. Furthermore, when terminals for inputting block-selection signals in the printhead are connected to corresponding terminals of a printer, the connection positions have to be changed, taking a direction of an element substrate into consideration. This results in complicated manufacturing process of the printhead.

SUMMARY OF THE INVENTION

The present invention has been made in consideration of the above situation, and has as its object to provide a printhead which is constructed with a plurality of common-type element substrates that sandwich a connecting board, and which is driven by a common-type control signal, a head cartridge and a printer using the printhead.

According to one aspect of the present invention, the foregoing object is attained by providing a printhead, integrating a plurality of printing elements arrayed in one line on one element substrate and a logical circuit for operating the plurality of printing elements, for performing printing by dividing the plurality of printing elements into a plurality of blocks and time-divisionally driving each block, comprising: a first terminal for inputting a block-selection signal which selects one of the plurality of blocks; a second terminal for inputting an inverse instruction signal which instructs to invert the block-selection signal; an inverse circuit for inverting the block-selection signal in accordance with the inverse instruction signal; and a selection circuit for selecting one of the plurality of blocks in accordance with an output of the inverse circuit, wherein the first and second terminals, the inverse circuit and the selection circuit are integrated on the element substrate.

Furthermore, it is possible to provide a printhead where at least two of the above-described element substrate, arranged opposite to each other, are used, and where plural arrays of printing elements are formed.

According to another aspect of the present invention, the foregoing object is attained by providing a printer using the printhead having the above-described construction.

Herein, it is preferable to perform controlling in the printer such that a high-level inverse instruction signal is inputted to the second terminal of one of the two element substrates arranged opposite to each other, while a low-level inverse instruction signal is inputted to the second terminal of the other element substrate of the two element substrates.

Note that the printhead having the above-described construction is an ink-jet printhead which performs printing by discharging ink, and preferably includes a heat energy transducer for generating heat energy to be provided to ink.

According to still another aspect of the present invention, the foregoing object is attained by providing a head cartridge comprising the printhead having the above-described construction, and an ink tank containing ink to be supplied to the printhead.

One remarkable feature of the present invention is in that, on the element substrates of the ink-jet printhead, a terminal for inputting an inverse instruction signal of a block-selection signal is FJ provided to block-dividing means which divides the plurality of heat-energy generating elements into a plurality of blocks and time-divisionally drives each block. Accordingly, when a plurality of element substrates are combined to construct an ink-jet printhead, the block-selection signal does not need to be changed for each element substrate.

In accordance with the above-mentioned invention, the printhead integrates: a plurality of printing elements, arrayed in one line, on one element substrate; a logical circuit for operating the plurality of the elements; the first terminal for inputting a block-selection signal which selects one of a plurality of blocks; the second terminal for inputting an inverse instruction signal which instructs to invert the block-selection signal; an inverse circuit for inverting the block-selection signal in accordance with the inverse instruction signal; and a selection circuit for selecting one of the plurality of blocks in accordance with the inverted block-selection signal, wherein the printhead, including at least two or more of the element substrate arranged opposite to each other and including plural arrays of printing elements, is utilized. When printing is performed by time-divisionally driving the printing elements in a block unit, the inverse instruction signal inverts the order of the block selection which has been inverted because of the element substrates arranged opposite to each other.

Thus, the invention is particularly advantageous since the order of the block-selection signal does not need to be changed for each element substrate. In addition, a common method can be used to control the common-type element substrate. Accordingly, a printer using the printhead according to the present invention does not have to perform complicated print control, thus, it is possible to reduce the processing load performed by control circuits in the printer.

By virtue of the above, in a case where a large scale printhead is to be constructed by combining a large number of the element substrates, the common-type element substrates can be controlled by the common method so that manufacturing cost can be reduced. In addition, by virtue of the common-type element substrate and the common controlling method, the increase in the number of signal terminals in the printhead can be minimized. Therefore, downsizing and cost reduction of the printhead can be realized.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate the embodiment of the invention, and together with the description, serve to explain the principles of the invention.

FIG. 6 is an equivalent circuit diagram showing an internal configuration of a logical circuit integrated in the element substrate of the conventional printhead having 64 ink discharge orifices.

DETAILED DESCRIPTION OF THE PREFERRED EMBODIMENT

Preferred embodiment of the present invention will be described in detail in accordance with the accompanying drawings.

<Brief Description of Apparatus Main Unit>

Figure 1:
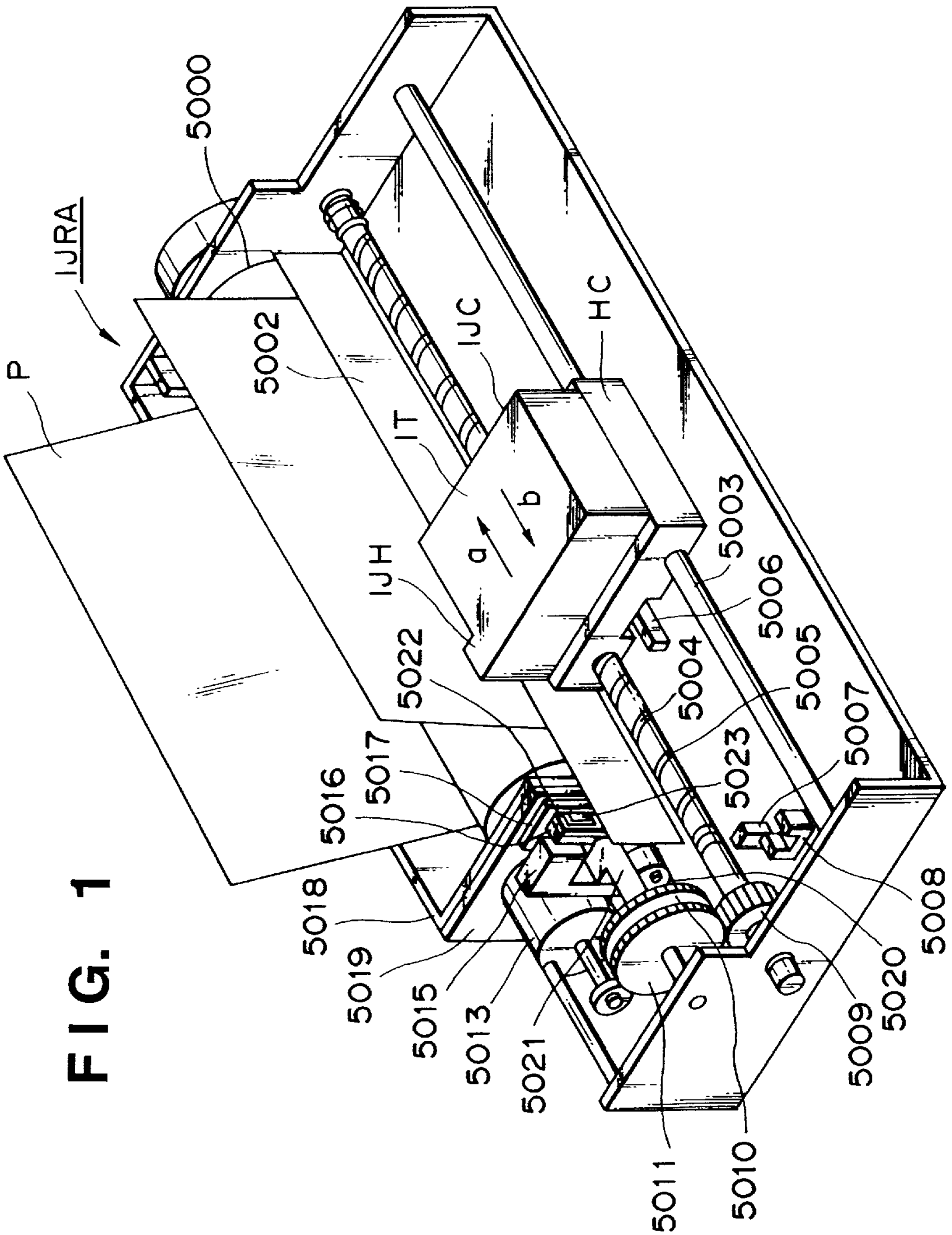
FIG. 1 is a perspective view showing an outer appearance of an ink-jet printer IJRA as a typical embodiment of the present invention.

FIG. 1 is a perspective view showing an outer appearance of an ink-jet printer IJRA as a typical embodiment of the present invention. Referring to FIG. 1, a carriage HC engages with a spiral groove 5004 of a lead screw 5005, which rotates via driving force transmission gears 5009 to 5011 upon forward/reverse rotation of a driving motor 5013. The carriage HC has a pin (not shown), and is reciprocally scanned in the directions of arrows a and b while being supported by a guide rail 5003. An integrated ink-jet cartridge IJC, incorporating a printhead IJH and an ink tank IT, is mounted on the carriage HC. Reference numeral 5002 denotes a sheet pressing plate, which presses a paper sheet P against a platen 5000, ranging from one end to the other end of the scanning path of the carriage HC. Reference numerals 5007 and 5008 denote photocouplers which serve as a home position detector for recognizing the presence of a lever 5006 of the carriage in a corresponding region, and are used for switching, e.g., the rotating direction of the motor 5013. Reference numeral 5016 denotes a member for supporting a cap member 5022, which caps the front surface of the printhead IJH; and 5015, a suction device for sucking ink residue through the interior of the cap member. The suction device 5015 performs suction recovery of the printhead via an opening 5023 of the cap member 5015. Reference numeral 5017 denotes a cleaning blade; 5019, a member which allows the blade to be movable in the back-and-forth direction of the blade. These members are supported on a main unit support plate 5018. The shape of the blade is not limited to this, but a known cleaning blade can be used in this embodiment. Reference numeral 5021 denotes a lever for initiating a suction operation in the suction recovery operation. The lever 5021 moves upon movement of a cam 5020, which engages with the carriage, and receives a driving force from the driving motor via a known transmission mechanism such as clutch switching.

The capping, cleaning, and suction recovery operations are performed at their corresponding positions upon operation of the lead screw 5005 when the carriage reaches the home-position side region. However, the present invention is not limited to this arrangement as long as desired operations are performed at known timings.

An ink-jet printer IJRA having the above-described configuration includes a print sheet automatic feeder (not shown) for automatically feeding a print sheet P.

<Description of Control Circuit>

Figure 2:
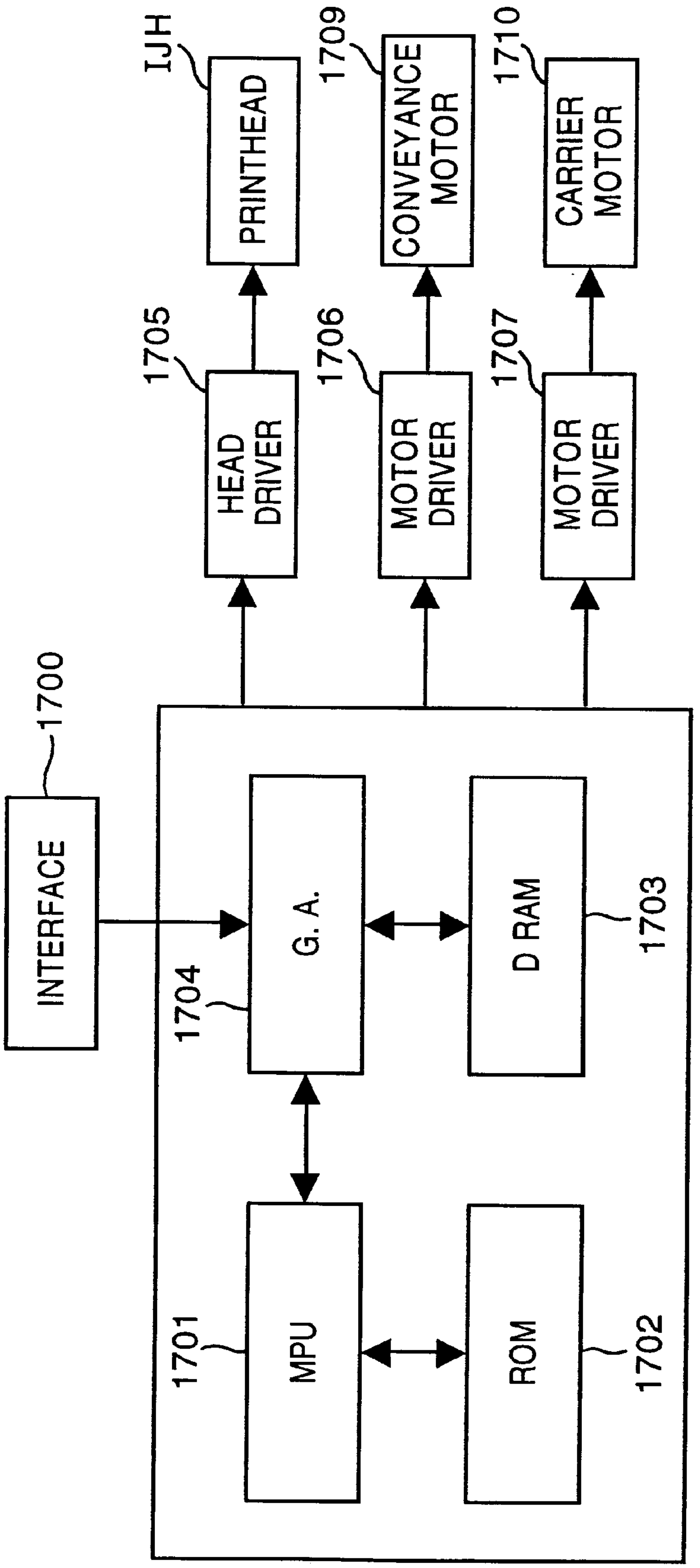
FIG. 2 is a block diagram showing an arrangement of a control circuit of the ink-jet printer IJRA.

Hereinafter, description will be provided on the control circuit for executing print control of the above-described printer. FIG. 2 is a block diagram showing an arrangement of a control circuit of the ink-jet printer IJRA. Referring to FIG. 2 showing the control circuit, reference numeral 1700 denotes an interface for inputting an image signal; 1701, an MPU; 1702, a ROM for storing a control program executed by the MPU 1701; and 1703, a DRAM for storing various data (aforementioned image signals, or image data supplied to the printhead IJH, and the like). Reference numeral 1704 denotes a gate array (G.A.) for performing supply control of print data to the printhead IJH. The gate array 1704 also performs data transfer control among the interface 1700, the MPU 1701, and the DRAM 1703. Reference numeral 1710 denotes a carrier motor for conveying the printhead IJH; and 1709, a conveyance motor for conveying a printing sheet. Reference numeral 1705 denotes a head driver for driving the printhead IJH; and 1706 and 1707, motor drivers for driving the conveyance motor 1709 and the carrier motor 1710.

The operation of the aforementioned control structure is now described. When a print signal is inputted to the interface 1700, the print signal is converted to print data by the gate array 1704 and MPU 1701 intercommunicating with each other. As the motor drivers 1706 and 1707 are driven, the printhead IJH is driven in accordance with the print data transferred to the head driver 1705, thereby performing printing.

In the foregoing arrangement, description has been provided assuming that the ink tank IT is integrated in the integrated-type ink-jet cartridge IJC together with the printhead IJH. In addition to the ink-jet cartridge having such configuration, an ink-jet cartridge, where the ink tank (container) for maintaining ink to be supplied to the printhead IJH is separable from the cartridge, may be utilized.

Figure 3:
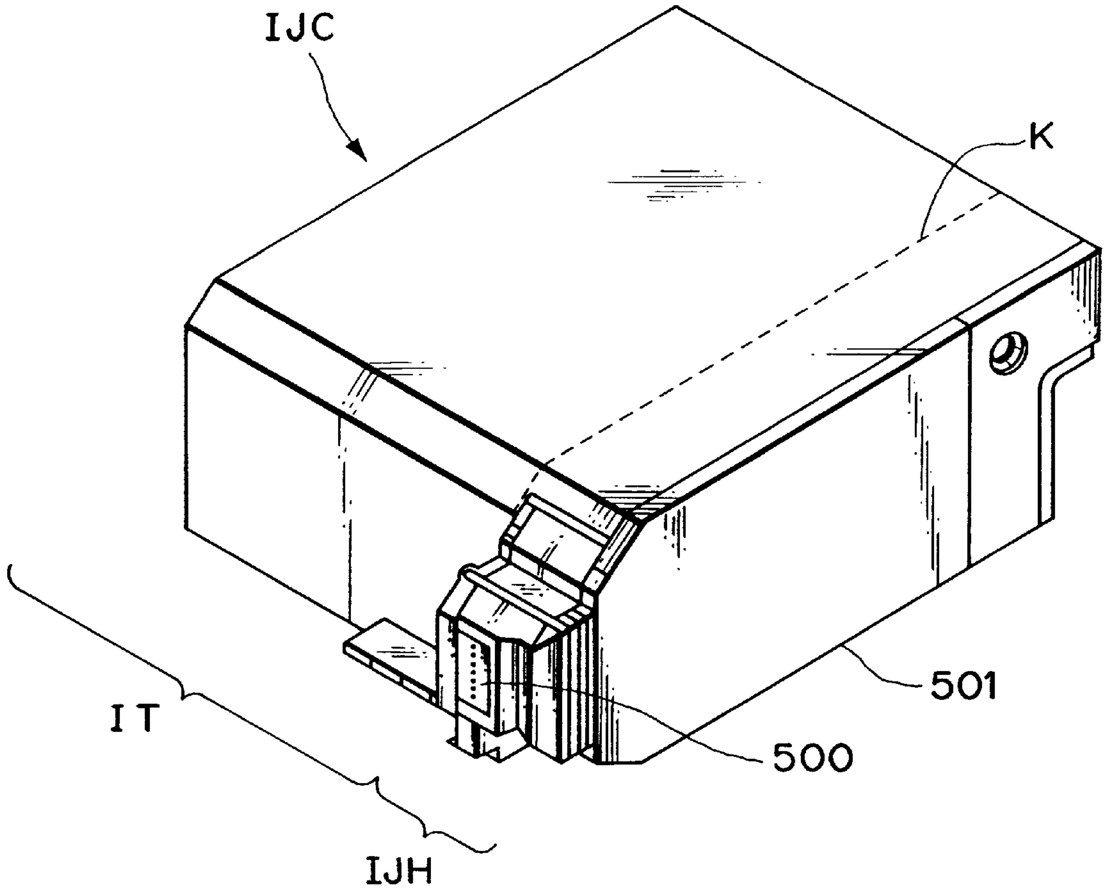
FIG. 3 is a perspective view showing an outer appearance of the ink-jet cartridge IJC having a structure where a printhead IJH and an ink tank IT are separable.

FIG. 3 is a perspective view showing an outer appearance of the ink-jet cartridge IJC having a structure where a printhead IJH and an ink tank IT are separable.

Referring to FIG. 3, reference numeral 500 denotes an ink-discharge nozzle; and 501, an element substrate where driving circuits and logical circuits of the printhead are integrated. In the ink-jet cartridge IJC shown in FIG. 3, the printhead IJH having a plurality of discharge orifices 500 can be separated at the boundary line K from the ink tank IT containing ink to be supplied to the printhead IJH. The ink-jet cartridge IJC includes an electrical contact portion so as to receive an electrical signal from the carriage HC when mounted on the carriage HC. The printhead IJH is driven by the received electrical signal. The ink tank IT includes a fibrous or porous ink absorbing member for maintaining ink.

Supplying of ink to the ink tank IT which constitutes the ink-jet cartridge IJC is performed in the following manner. More specifically, an ink supplying pipe or the like is connected with the ink tank IT to form an ink introducing path for introducing ink. Ink is supplied to the ink tank (container) through the ink introducing path. As an ink supply opening in the ink tank IT, an ink supply opening to the printhead IJH, an air supply opening, or a hole opened on a wall of the ink container, may be used.

Figure 4:
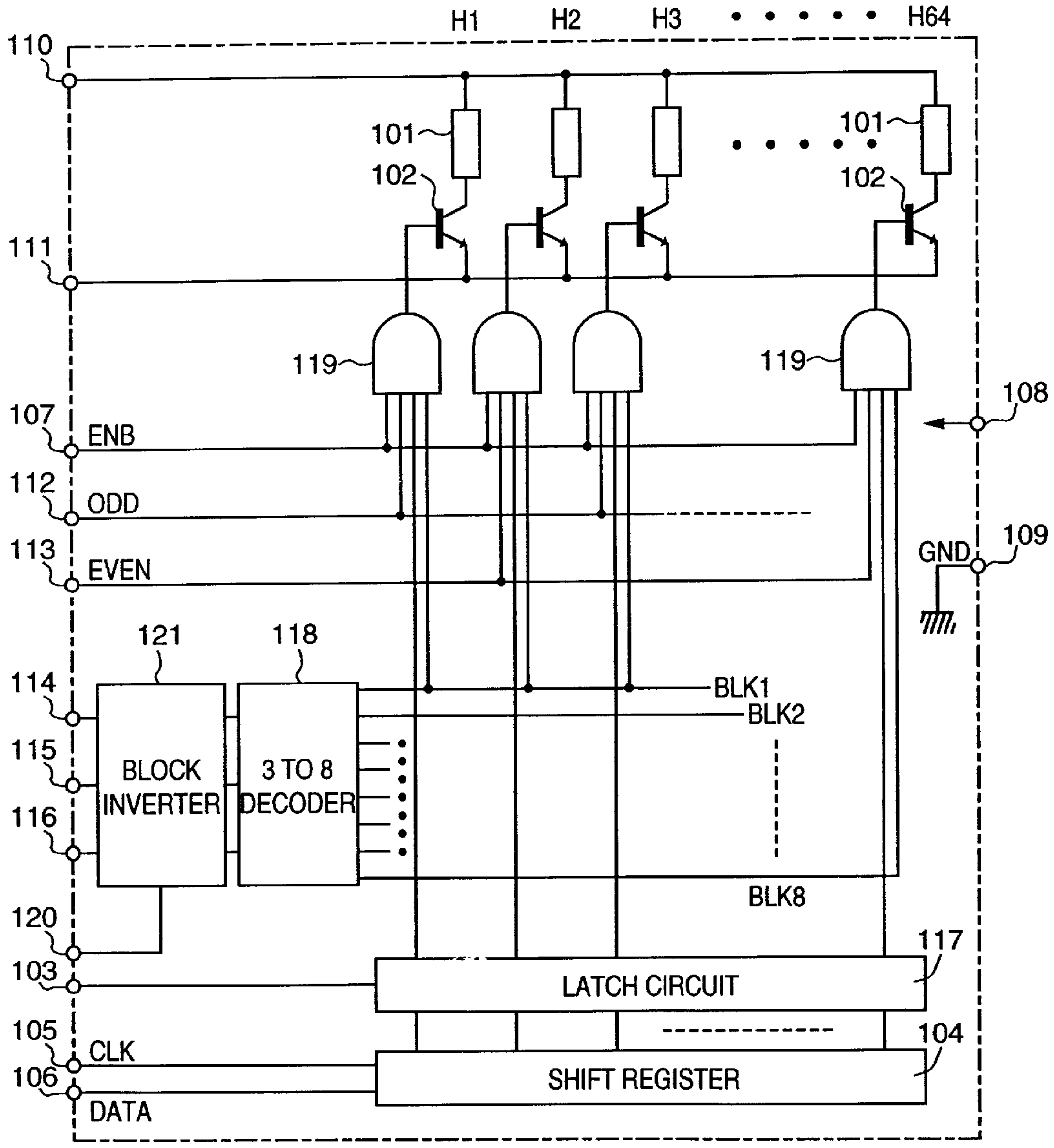
FIG. 4 is an equivalent circuit diagram showing an internal configuration of a logical circuit of the printhead IJH.

FIG. 4 is an equivalent circuit diagram showing an internal configuration of a logical circuit of the printhead IJH. This example in FIG. 4 is constructed basically the same as the logical circuit of the printhead explained with reference to FIG. 6. The same reference numerals are assigned to the common compositional elements, and description thereof will be omitted.

With reference to FIG. 4, reference numeral 120 denotes an input terminal for inputting an inverse instruction signal (INV) which instructs whether or not 3-bit block-selection signals (B2, B1 and B0), inputted in a unit of one bit respectively by the input terminals 114 to 116, are to be inverted. Reference numeral 121 denotes a block inverter which inverts the block-selection signals (B2, B1 and B0) and outputting the inverted signal to the 3 to 8 decoder 118.

According to the present embodiment, when the inverse instruction signal (INV) inputted to the input terminal 120 is "LOW", the 3-bit block-selection signals (B2, B1 and B0) are inputted to the 3 to 8 decoder 118 without being inverted, so that the block selection similar to the conventional example is executed. On the other hand, when the inverse instruction signal (INV) is "HIGH", the 3-bit block-selection signals (B2, B1 and B0) are inverted by the block inverter 121 and inputted to the 3 to 8 decoder 118.

For instance, assuming that 3-bit block-selection signals (B2, B1 and B0) are all "0" and the inverse instruction signal INV is "LOW," the output signal BLK1 of the 3 to 8 decoder 118 will become "ON," thus the heaters H1, H2 . . . , H8 are selected as similar to the conventional example. However, assuming the same block-selection signals, if INV is "HIGH," the block-selection signal actually inputted to the 3 to 8 decoder 118 will be "1" for all the 3 bits, thus the output signal BLK8 of the 3 to 8 decoder 118 will become "ON." As a result, heaters H57, H58, . . . , H64 are selected.

Figure 7A:
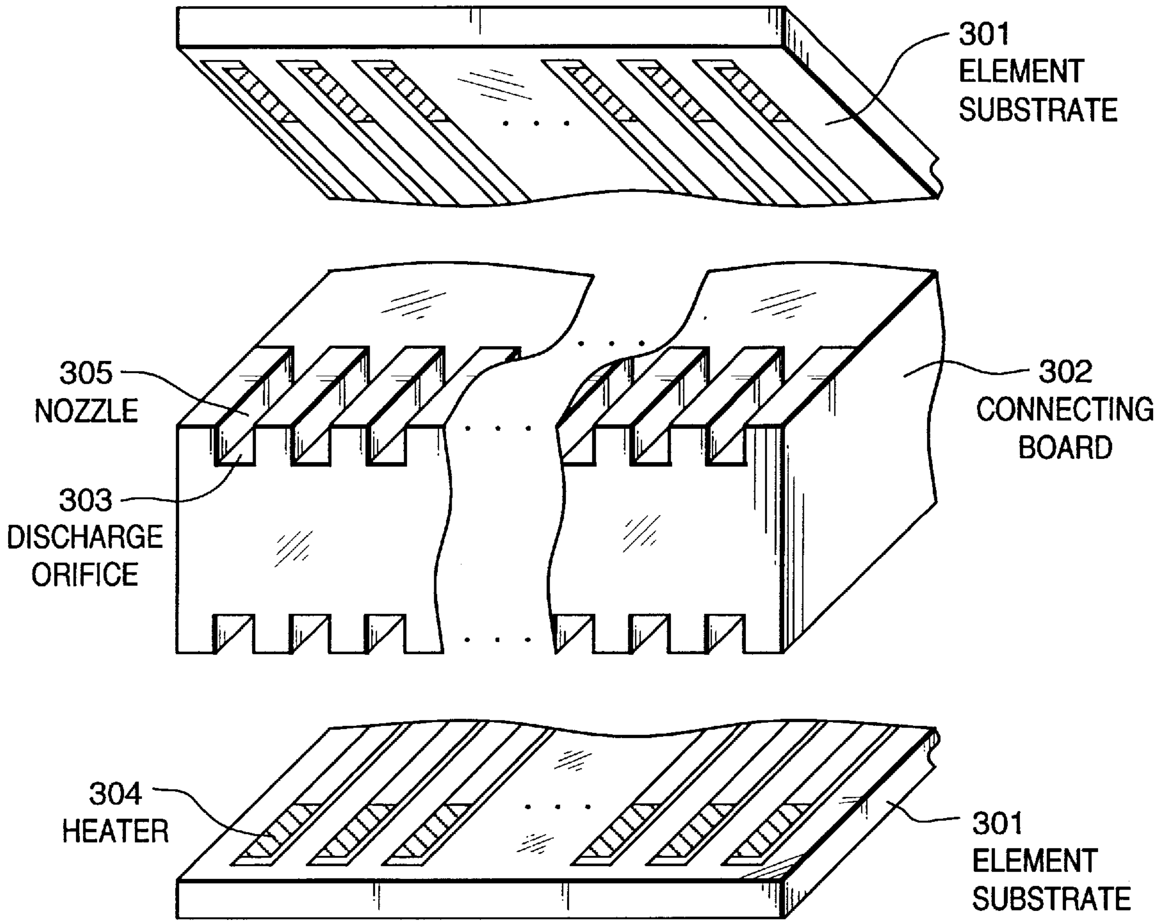
FIGS. 7A and 7B are an explanatory view illustrating the structure of a printhead where a connecting board 302 is sandwiched by two of an element substrate 301.
Figure 7B:
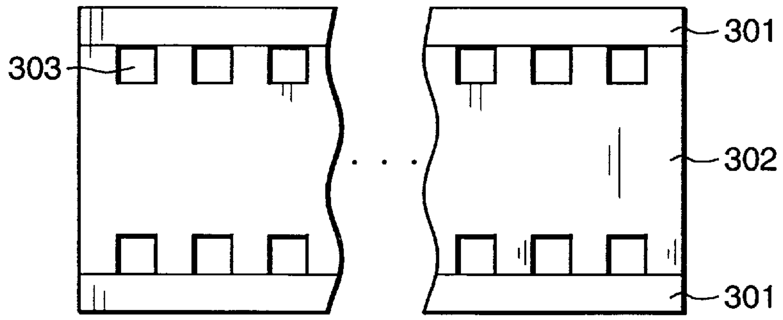

On account of the above configuration, for instance, in a case where printing is to be performed by utilizing the printhead having the structure as shown in FIGS. 7A and 7B where plural element substrates are combined, when heaters arranged at the upper element substrate are driven for performing printing, a signal is outputted to the input terminal 120 of the upper element substrate to output "LOW" inverse instruction signal (INV). Meanwhile, when heaters arranged at the lower element substrate are driven for performing printing, a signal is outputted to the input terminal 120 of the lower element substrate to output "HIGH" inverse instruction signal (INV). Accordingly, the printhead is driven without considering the order of the array of the logical circuit integrated in the element substrates.

Note that in a case where two element substrates are integrated opposite to each other, the MPU 1701 of the printer executes controlling such that data is transferred in the order of b1, b2, . . . , b64 to the shift register integrated in one of the element substrates, while to the other element substrate, data is transferred in the order of B64, B63, . . . , B1. With respect to the ODD signal and EVEN signal, the MPU 1701 executes control such that while an ODD signal and EVEN signal are respectively inputted to the input terminals 112 and 113 of one of the element substrates, an EVEN signal and ODD signal are respectively inputted to the input terminals 112 and 113 of the other of the element substrates.

According to the above-described embodiment, it is possible to realize time-divisional control in the printhead by utilizing the common-type control signal and the common-type element substrate, without changing block-selection signals (B2, B1 and B0) or the hardware interface between the printhead and the printer, by simply adding, to the logical circuit of the printhead, a terminal for inputting an inverse instruction signal (INV) from the printer, and a circuit for inverting a block-selection signal in accordance with the inverse instruction signal (INV).

In addition, according to the present embodiment, it is not necessary to double the number of signal terminals in the printhead, as the conventional example does. Therefore, the size of the element substrate can be kept small, contributing to down-sizing of the printhead.

Figure 5:
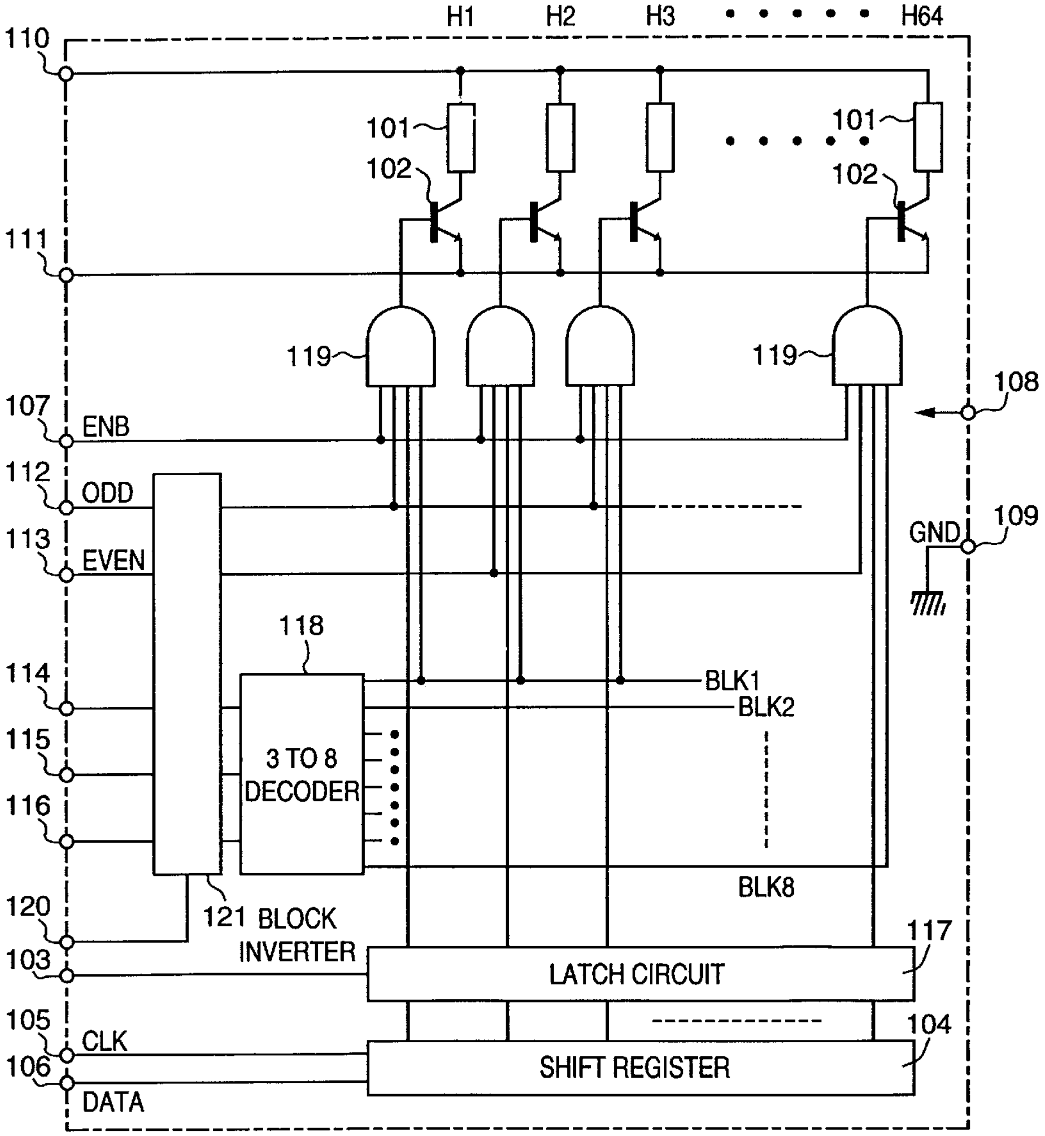
FIG. 5 is an equivalent circuit diagram showing an internal configuration of a logical circuit of the printhead as a modified example.

Furthermore, as shown in FIG. 5 which shows a modification of the above-described embodiment, the block inverter 121 may be provided as a circuit to invert and output also the ODD signal and EVEN signal. By comprising such inverter 121, in a case where two element substrates are integrated opposite to each other, the ODD signal and EVEN signal can be commonly inputted, thus it is possible to realize the preferable configuration of the present invention.

Note that in the foregoing description, as shown in FIGS. 7A and 7B, the printhead having a structure where the two element substrates are integrated opposite to each other has been exemplified. However, the present invention is not limited to this. For instance, the present invention is applicable to a printhead constructed such that a plurality of units, each unit having two element substrates arranged opposite to each other to sandwich a grooved member, are combined. For instance, the present invention is applicable to a color printhead which comprises four element substrates (four nozzle arrays) where two of the aforementioned unit are combined, for discharging color ink: black, magenta, cyan and yellow, from the respective element substrates (nozzle arrays).

From the ink-jet printing method, the foregoing embodiment particularly adopts means (e.g. an electrothermal transducer, laser beam and the like) for generating heat energy to be applied to discharge ink, and the method of utilizing the heat energy to change the state of ink, thereby realizing printing at high density in high precision.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with particularly high response characteristics.

As a pulse-form driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only a cartridge type printhead in which an ink tank is integrally arranged on the printhead itself as described in the above embodiment, but also an exchangeable chip type printhead, which can be electrically connected to the apparatus main unit and can receive ink from the apparatus main unit upon being mounted on the apparatus main unit, can be applicable to the present invention.

It is preferable to add recovery means for the printhead, preliminary auxiliary means, and the like to the arrangement of the printer of the present invention, since the printing operation can be further stabilized. Examples of such means include, for the printhead, By capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices (e.g., host computer, interface, reader, printer and the like) or to an apparatus comprising a single device (e.g., copy machine, facsimile apparatus and the like).

As many apparently widely different embodiments of the present invention can be made without departing from the spirit and scope thereof, it is to be understood that the invention is not limited to the specific embodiments thereof except as defined in the appended claims.

What is claimed is:

1. A printhead, integrating a plurality of printing elements arrayed in one line on one element substrate and a logical circuit for operating the plurality of printing elements, for performing printing by dividing the plurality of printing elements into a plurality of blocks and time-divisionally driving each block, comprising:

a first terminal for inputting a block-selection signal which selects one of the plurality of blocks;

a second terminal for inputting an inverse instruction signal so as to invert a block selection sequence;

an inverse circuit for inverting the block selection sequence in accordance with the inverse instruction signal; and a selection circuit for selecting one of the plurality of blocks in accordance with an output of said inverse circuit, wherein said first and second terminals, said inverse circuit and said selection circuit are integrated on the element substrate.

2. The printhead according to claim 1, wherein the block-selection signal is expressed by 3-bit data, and said selection circuit is a 3 to 8 decoder which inputs the 3-bit block-selection signal and generates eight output signals each having one bit.

3. The printhead according to claim 1, wherein each of the plurality of printing elements includes a heater and a power transistor.

4. The printhead according to claim 1, wherein the logical circuit includes:

a shift register for inputting an image signal and temporarily storing the image signal;

a latch circuit for latching the image signal stored in said shift register; and an AND circuit for calculating a logical AND of an output of said latch circuit, an output of said selection circuit and an enable signal which drives the plurality of printing elements.

5. The printhead according to claim 4, wherein said AND circuit calculates the logical AND by inputting a first instruction signal which instructs to drive odd-numbered printing elements among the plurality of printing elements, or a second instruction signal which instructs to drive even-numbered printing elements among the plurality of printing elements.

6. The printhead according to claim 5, wherein said inverse circuit inverts the first instruction signal and the second instruction signal in accordance with the inverse instruction signal.

7. The printhead according to claim 1, wherein at least two of the element substrate are arranged opposite to each other, and a plurality of arrays of the printing elements are formed.

8. A printer using the printhead claimed in claim 7.

9. A printer according to claim 8, further comprising control means for executing controlling such that a high-level inverse instruction signal is inputted to said second terminal provided in one of the two element substrates arranged opposite to each other, and a low-level inverse instruction signal is inputted to said second terminal provided in an other of the two element substrates.

10. The printhead according to claim 1, wherein said printhead is an ink-jet printhead which performs printing by discharging ink.

11. The printhead according to claim 10, wherein said printhead is a printhead which discharges ink by utilizing heat energy, and includes a heat energy generator for generating heat energy to be provided to the ink.

12. A cartridge comprising the printhead claimed in claim 10 and an ink container containing ink to be supplied to said printhead.

* * * * *

UNITED STATES PATENT AND TRADEMARK OFFICE

CERTIFICATE OF CORRECTION

PATENT NO. : 6,130,692
DATED : October 10, 2000
INVENTOR(S) : Muga Mochizuki et al.

It is certified that error appears in the above-identified patent and that said Letters Patent is hereby corrected as shown below:

Title page,
Item [54], Title, and Column 1, line 1,
"TIME" should read -- TIME- --.

Item [57], ABSTRACT,
Line 9, "block selection" should read -- block-selection --.

Column 4,
Line 48, "FJ" should be deleted.

Column 8,
Line 62, "unit" should read -- units --.

Column 9,
Line 15, "channels" should read -- channel --;
Line 66, "By" should be deleted.

Column 10,
Lines 37, and 38, "block selection" should read -- block-selection --.

Column 11,
Line 11, "substrate" should read -- substrates --.

Column 12,
Line 4, "an other" should read -- another --.

Signed and Sealed this

Twenty-ninth Day of January, 2002

*Attest:*

*Attesting Officer*

JAMES E. ROGAN
*Director of the United States Patent and Trademark Office*